United States Patent [19]

Masek et al.

[11] Patent Number: 5,577,642
[45] Date of Patent: Nov. 26, 1996

[54] SYSTEM FOR METERING A PRODUCT IN POWDER FORM

[75] Inventors: Petr Masek, Granges; Jean-François Tinembart, Yverdon, both of Switzerland

[73] Assignee: Nestec S.A., Vevey, Switzerland

[21] Appl. No.: 420,016

[22] Filed: Apr. 11, 1995

[30] Foreign Application Priority Data

May 6, 1994 [EP] European Pat. Off. ............... 94107109

[51] Int. Cl.⁶ .................................................. G01F 11/28
[52] U.S. Cl. .......................... 222/438; 222/448; 222/449; 222/453
[58] Field of Search ............................. 141/21, 371–373; 222/185.1, 181.3, 181.1, 441, 438, 448, 449, 453, 518, 444, 434

[56] References Cited

U.S. PATENT DOCUMENTS

| 576,241 | 2/1897 | Van Ame | 222/449 |
|---|---|---|---|
| 1,305,476 | 6/1919 | McCord | 222/449 |
| 1,988,865 | 1/1935 | Campbell | 222/453 |
| 2,703,666 | 3/1955 | Iannelli | 222/448 |
| 2,987,224 | 6/1961 | Chapman | 222/448 |
| 3,102,828 | 10/1963 | Costakos | 222/438 |
| 4,724,984 | 2/1988 | Wilken et al. | 222/361 |

FOREIGN PATENT DOCUMENTS

| 815715 | 4/1937 | France . | |
| 1205016 | 1/1960 | France | 222/453 |
| 1405580 | 5/1965 | France . | |
| 3913401 | 10/1990 | Germany . | |
| 244003 | 2/1947 | Switzerland . | |
| 308954 | 4/1929 | United Kingdom . | |

*Primary Examiner*—Kevin P. Shaver
*Assistant Examiner*—Philippe Derakshani
*Attorney, Agent, or Firm*—Vogt & O'Donnell, LLP

[57] ABSTRACT

A device for containing and metering a powder-form product has a body member which defines a hopper and a tube which extends from the hopper. The tube has successive portions configured to provide at least one metering chamber and a flow chute which extends to a tube opening for delivering powder-form product from the hopper via the metering chamber. A plug member is connected with a closure member which, in turn, is connected to a connecting member which, in turn, is connected with a housing member positioned in the hopper. A mounting member is affixed with the hopper, a first rotatable lever extends from the mounting member into the hopper, and a second rotatable lever extends from the mounting member outside of the hopper about a same axis as the first lever so that upon rotation of the second lever, the first lever is rotated. The housing member is configured for being engaged by rotation of the first lever, and the closure member and plug are configured and positioned, respectively, to cooperate with the metering chamber and to open and close the tube opening for dispensing metered amounts of powder-form product.

17 Claims, 5 Drawing Sheets

SYSTEM FOR METERING A PRODUCT IN POWDER FORM

BACKGROUND OF THE INVENTION

The invention relates to a system for metering a product in powder form, in particular for water-soluble powders.

Systems delivering products in granular form are already known, such as, for example, the device forming the subject of U.S. Pat. No. 4,724,984. However, this system has various drawbacks, in particular that of giving a solution for dispensing the product in which there is not, strictly speaking, complete closure of the system, so that it is not possible to guarantee, on the one hand, complete hygiene and, on the other hand, total absence of depositing on the walls, particles which have not been delivered.

SUMMARY OF THE INVENTION

The device forming the subject of the present invention makes it possible to guarantee even metering, which leads to optimum quality of the beverage prepared. The object of the present invention is furthermore to provide a metering system with which correct hygiene can be guaranteed in dispensing, and it is possible to avoid, such as in a climate with a high relative humidity any degradation of the product by virtue of complete closure of the system. This problem is particularly critical for all water-soluble products, such as instant coffee. It is thus necessary to have available a metering system which is indeed leaktight, guaranteeing perfect protection of the product to be dispensed against water vapour and ensuring its good quality over a long period of time.

The present invention provides a system for metering a product in powder form, comprising

- a body for holding the product to be metered, the said body comprising a hopper in its upper part, extending downwards to a table having at least one metering chamber and a flow chute which is smaller than the hopper,
- a metering slidable member designed to slide between a closed position and an open position in the tube and comprising, at the level of the hopper, a housing for cooperating with a control system, a connection part connecting the said housing to a closure member, the closure member having a cross-section substantially corresponding to that of the tube interior cross-section and a closure plug of cross section smaller than that of the closure member and designed to close the outlet orifice of the flow chute, and
- a control system arranged at the level of the hopper of the holding body and comprising an outer lever and an inner lever which are mounted so as to rotate about the same axis, the inner lever cooperating with the housing of the metering slidable member.

The flow chute may be of square, rectangular or round shape. The body for holding the product may be in two parts, so as to allow assembly, disassembly and cleaning.

DETAILED DESCRIPTION OF THE INVENTION

In the system of the present invention, it is sufficient to fill the body for holding the product to be metered with the said product to be dispensed and then to operate the control system manually by acting on the outer lever so that the metering slidable member opens the metering chamber, thus delivering the metered quantity of product in powder form into a cup or a mug located directly below the outlet orifice of the flow chute. It then remains to add the appropriate quantity of hot or cold water to the said powder.

As already mentioned, it is important for the product in powder form to be correctly isolated from the ambient atmosphere. This is the reason why the body for holding the product to be metered comprises a lid for closing the top of the said body in a leaktight manner.

The metering system according to the invention makes it possible to meter any type of product in water-soluble powder form, in particular instant coffee, sugar and instant tea. The system finds a highly advantageous application in any part of the world which has a climate with high relative humidity since it is possible to avoid any premature wetting of the powder.

The only interior region in which the system is in contact with the ambient atmosphere is the outlet orifice of the flow chute, this outlet being closed by the closure plug. It is only at this location that blockage of the system might occur. This problem is solved, however, by a specific geometry of the inner lever, making it possible to multiply by 8 the detachment force when initiating the vertical translational movement of the metering slidable member, in the event that the closure plug might actually have stuck onto the periphery of the outlet orifice of the chute.

In the device according to the invention, it is preferable to provide two metering chambers arranged symmetrically with respect to the plane of symmetry of the flow chute. Metering chambers of variable volume are preferably provided, for example in order to vary the metered quantity between a volume substantially lying between 4 and 20 ml, which corresponds to a weight of between 1.5 and 4.5 g.

It is clear that, when the metering slidable member is moved in order to open the metering chamber or chambers, in order for the product to be able to flow freely, it is necessary for the closure plug to have a cross-section which is smaller than that of the closure member, e.g., a cross-section of the closure plug which is substantially half that of the closure member is chosen. A closure plug having a circular cross-section is preferably envisaged, the cross-section of the closure member being square or rectangular. In the case of the closure plug, a diameter lying between 10 and 40 mm, preferably equal to 20 mm is envisaged.

In order to produce a metered quantity which pours directly into the cup or mug, a centring stop is provided in the vicinity of the outlet orifice of the flow chute. This stop has, for example, the form of two parallel vertical rods.

It has also been observed that in order to guarantee better precision of the metering, it is preferable to provide a wall in the hopper, so as to prevent the entire weight of the product in powder form from bearing on the metering slidable member; this wall is arranged so as to cover the metering slidable member.

When the system is in its closed position, it is necessary for the metering chambers to be directly above the closure member, which corresponds to choosing a height of the flow chute corresponding substantially to that of the closure member and of the closure plug.

It may be envisaged for the metering system according to the invention to have stands for arranging it on a table or a counter, in which case the geometry of the stands is designed so that they simultaneously form the centring stop. The metering system may also be designed to be fixed to the wall.

If the metering of various different types of coffee and/a of sugar, and of tea is envisaged, it is possible to combine a plurality of metering systems so as to form a metering assembly.

As already mentioned, the control system of the metering slidable member should allow occasional detachment of the two aforementioned parts, namely the closure plug and the flow chute. Provision is made for the inner and outer levers to be independent, in that the outer lever pivots freely about its rotational spindle whilst the inner lever is solidly attached to the spindle axis and turns with it. Since the outer lever pivots freely, it is provided with a pin so that actuating it makes it possible to raise the inner lever.

The independence of these two levers makes it possible to regulate the falling of the product in powder form. Provision is furthermore made for the outer lever to interact with a click, making it possible to delay the centre of the metering slidable member; this delay makes it possible to ensure complete descent of the product in powder form.

The system according to the invention is made, in the case of the body for holding the product to be metered and the metering slidable member, of transparent or opaque injected plastic. The metering slidable member may also be made of metal.

The rest of the description is given with reference to the drawings.

DETAILED DESCRIPTION OF THE DRAWINGS

Figure 1:
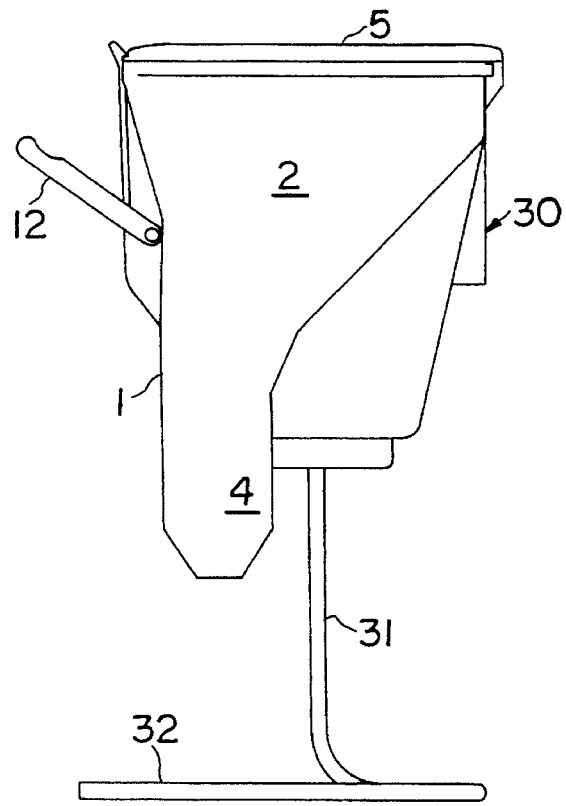
FIG. 1 is a diagrammatic representation of the metering system, produced on stands.

As illustrated in FIG. 1, the metering system (30) is mounted on stands (32) and the vertical part (31) of the said stands forms a centring stop for metering the product in powder form. The body (1) for holding the product to be metered comprises a hopper (2) and a tube having a flow chute (4), as well as a lid (5) to cover a hopper opening for introducing powder-form product into the body (1). The product is metered manually using the outer lever (12).

Figure 2:
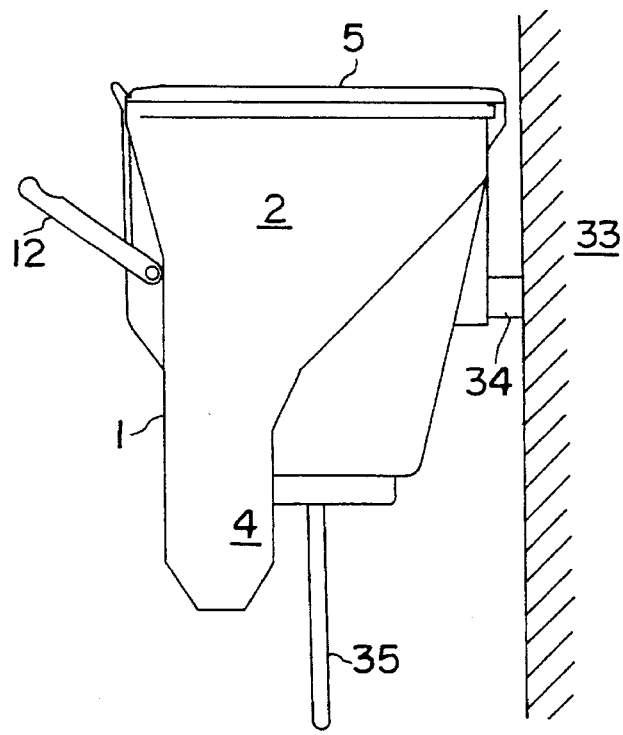
FIG. 2 is a diagrammatic representation of the metering system, fixed to the wall.

FIG. 2 represents the same metering system as that in FIG. 1, with the exception that, instead of being placed on a table or a counter, it is fastened to the wall (33) using a fastening system (34). In this case, a centring stop (35) is arranged behind the flow chute (4).

Figure 4:
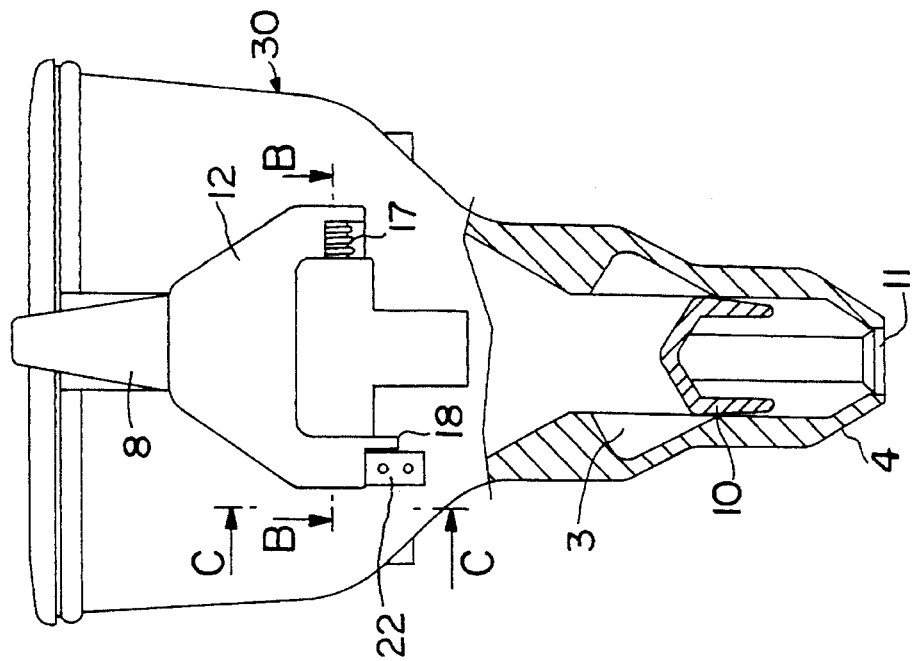
FIG. 4 is a partial section in a plane perpendicular to that in the preceding figure.
Figure 3:
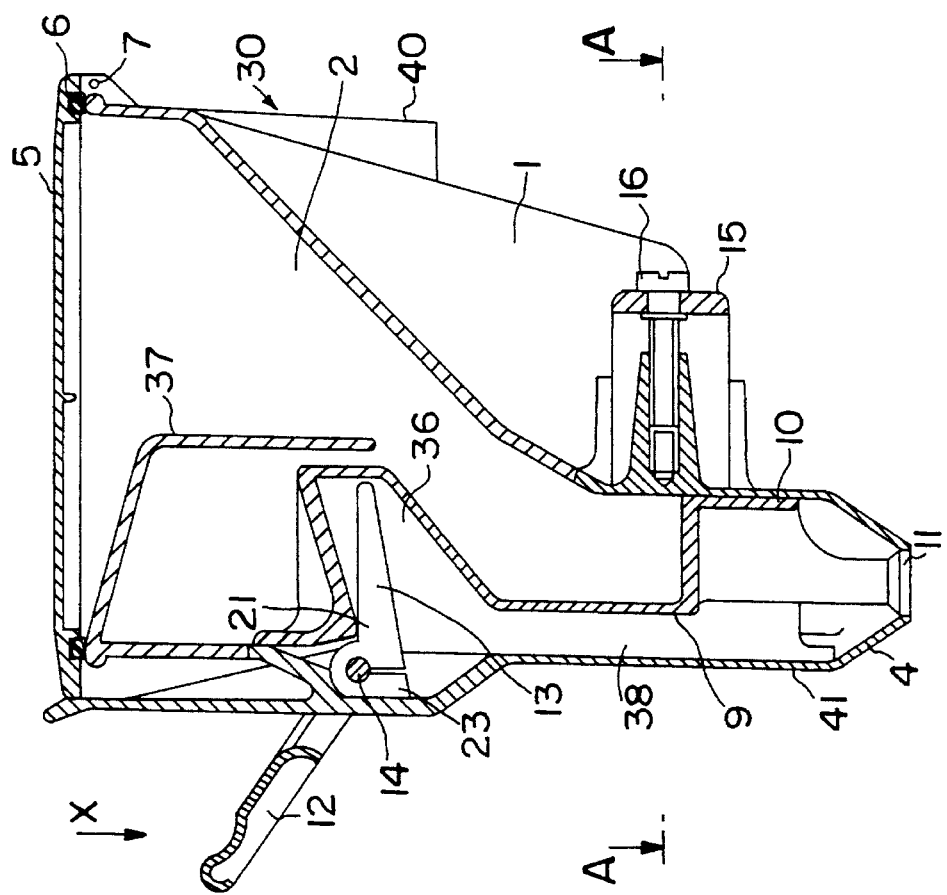
FIG. 3 is a section of the system according to the invention.
Figure 5:
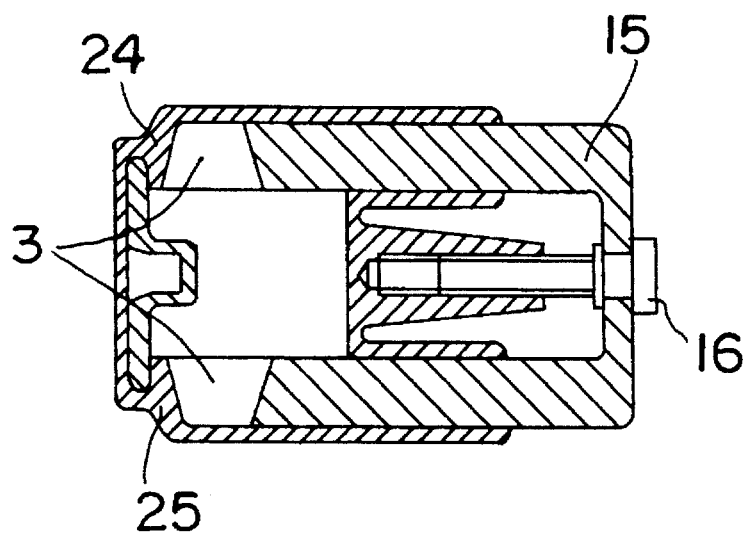
FIG. 5 is a section along the line A—A in FIG. 3.
Figure 6:
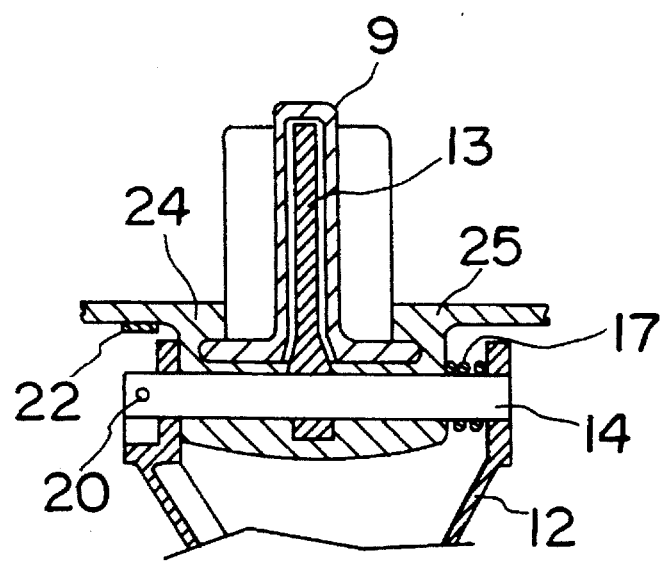
FIG. 6 is a section along the line B—B in FIG. 4.
Figure 7:
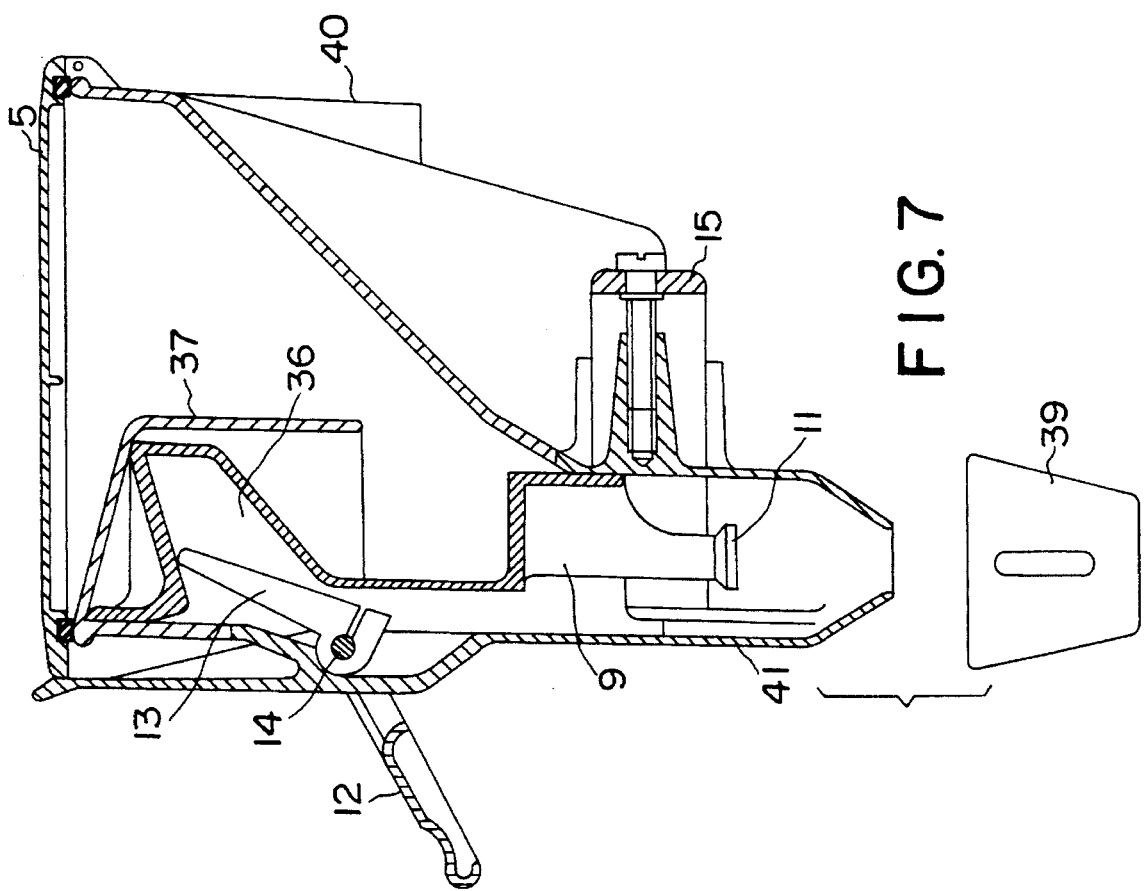
FIG. 7 is an equivalent section to that in FIG. 3, with the metering slidable member in the open position.

With reference to FIGS. 3–8, the metering system (30) is composed of the following parts:

a body (1) with a hopper (2) and a wall (37) in its upper part and a tube having successive portions which provide two metering chambers (3) and a flow chute (4) in its lower part, the said body being in two parts (40) and (41) (FIGS. 4, 5 and 7), a lid (5) with a seal (6) and a hinge (7) and held in its closed position by a hook (8) (FIGS. 3, 4 and 8), a metering slidable member (9) with a housing (36) for allowing it to be opened using the control system, a connection part (38), a closure member (10) and a closure plug (11) (FIGS. 3 and 6), a control system with an outer lever (12) and an inner lever (13) both being mounted on the same spindle (14) (FIGS. 3, 6, 7, 9 and 10), and an adjusting slide (15), with an adjustment screw (16) making it possible to vary the volume of the metering chambers (3) if necessary (FIGS. 3, 5 and 7).

The flow chute (4) is of rectangular cross section at the level of the closure member (10) and is round below.

The system operates as follows:

The body (1) is first of all filled with product in powder form and the lid (5) is reclosed. The volume of the chamber (3) is adjusted as indicated hereinabove, and a ready-to-use system is obtained.

Figure 8:
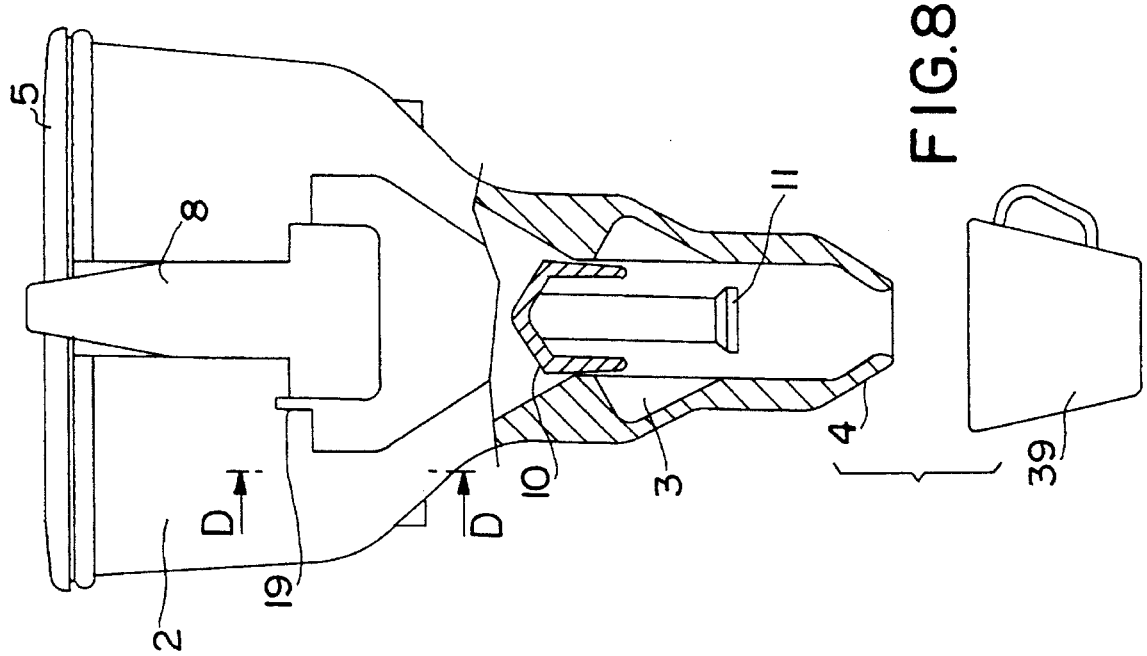
FIG. 8 is a partial section equivalent to that in FIG. 4, with the metering slidable member in the open position.

When the lever (12) is pressed in the direction of the arrow (FIG. 3), the inner lever (13) turns inside the housing (36) and pushes the slidable member (9) upwards, and the closure member (10) obstructs the passage between the hopper (2) and the metering chambers (3), releases the product from the said chambers and opens the flow chute (4) (FIGS. 7 and 8). The product falls into the cup (39).

When the lever (12) is released in its lower position, it rises because it is pushed by the torsion spring (17) (FIGS. 4 and 6). The motoring slidable member (9) descends under its own weight, frees the passage between the hopper (2) and the metering chambers (3) and closes the flow chute (4) in a leaktight manner. The product refills the metering chambers (3) and the operation can be repeated.

Figure 9:
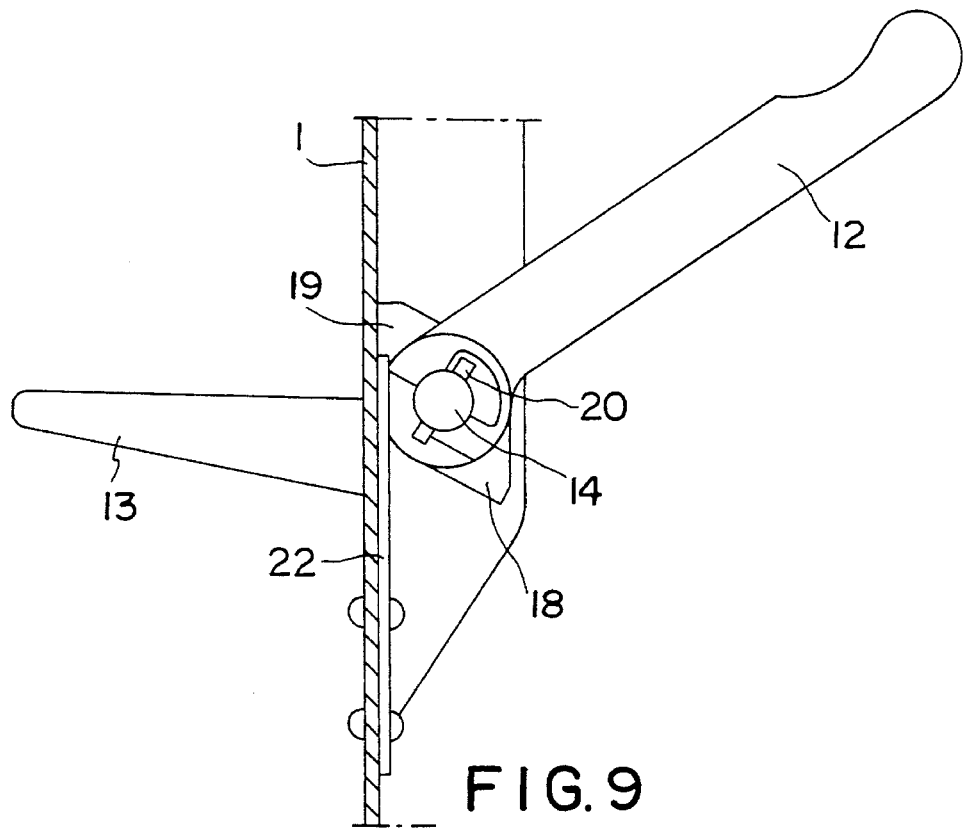
FIG. 9 is a section along the line C—C in FIG. 4.
Figure 10:
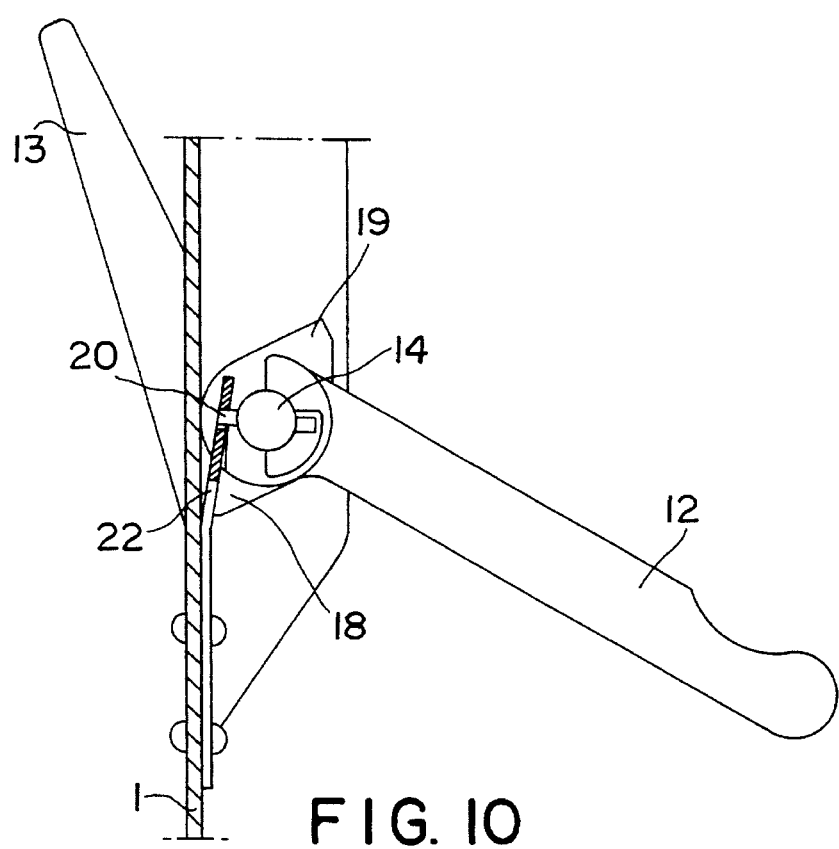
FIG. 10 is a section along the line D—D in FIG. 8.

The operation of the system may be described in more detail with reference to FIGS. 9 and 10. The outer lever (12) pivots about the spindle (14) and its movement is limited by the protrusions (18) and (19). It is pushed downwards by hand, in order to obtain a metered quantity of product, as described hereinabove. It rises back into its initial position under the effect of the torsion spring (17).

The lever (13) is solidly attached to the spindle (14) and is driven upwards by the pin (20) when the outer lever (12) moves downwards. The inner lever (13) drives the metering slidable member (9) upwards initially using a short arm (21) (FIG. 3). The latter is necessary for detaching the closure plug (11) if it is stuck against the f low chute (4) after the metering system has not been used for a long period of time.

The metering slidable member (9), the inner lever (13) and the spindle (14) are held in the upper position by a pin (20) and the click (22). The pin (20) is released when the outer lever (12) rises back into its initial position and pushes back the click (22). When the pin (20) is released, the metering slidable member (20) descends under its own weight, driving the inner lever (13) and the spindle (14).

The fact that the motoring slidable member (9) is held in the upper position extends the opening time, allows all of the product to fall into the cup (39) and regulates the lowering of the metering slidable member (9), which can be braked or held by the outer lever (12).

The metering slidable member (9), actuated by the inner lever (13), is stopped in its lower position by the protrusion (23). The metering slidable member is guided by two lateral guides (24) and (25) which are open upwards, allowing disassembly of the metering slidable member by pulling it upwards, when the lid (5) is open.

We claim:

1. A dispensing device for containing and metering a powder-form product comprising:

a product-containing and delivery body member which has wall portions which define first and second interior portions and two opposing openings wherein the first interior portion has a cross-section smaller than a cross-section of the second interior portion so that the first interior portion forms a tube and extends to a tube opening and so that the second interior portion forms a hopper which extends from a hopper opening for introduction of powder-form product into the hopper and from which the tube extends for delivering powder-form product from the hopper to the tube opening for dispensing powder-form product and wherein the tube comprises first, second, third and fourth successive tube interior wall portions, wherein the first tube portion extends from the hopper and the fourth tube portion contains the tube opening, wherein the second tube portion has a cross-section larger than the first and third tube portions for forming at least one metering chamber and wherein the fourth tube portion has a cross-section smaller than the first and third tube portions for forming a flow chute;

a lid for covering the hopper opening;

a closure member having a cross-section configured for sliding in the tube and for obstructing the first and third tube portions to passage of powder-form product;

a plug member which is connected with the closure member and which has a cross-section configured for movement in the fourth tube portion and for closing the tube opening;

a connecting member which is connected to and extends from the closure member towards the hopper;

a control system comprising a mounting member and first and second levers wherein the mounting member is affixed with the hopper and the first lever is connected with and extends from the mounting member so that the first lever extends into the hopper and is rotatable about an axis and wherein the second lever is connected with and extends from the mounting member outside of the body member and is rotatable about the axis about which the first lever rotates for actuating a rotational movement of the first lever; and a housing member which is connected to the connecting member and extends within the hopper and which is configured and positioned for being engaged by the first lever for reciprocative movement; and wherein the mounting member, the second lever, the connecting member, the closure member and the plug member are configured and positioned so that upon rotation of the second lever to a first position, the first lever engages the housing member for sliding the closure member and plug member in the tube so that the closure member slides from a position in the third tube portion past the metering chamber so that powder-form product passes from the metering chamber to the flow chute and so that the tube opening is open so that flow of powder-form product from the metering chamber is not obstructed by the plug member and so that upon rotation of the second lever to a second position, the first lever, housing member, closure member and plug member reciprocate so that the plug member closes the tube opening and the closure member slides to the position in the third tube portion to obstruct powder-form product flow.

2. A device according to claim 1 wherein the mounting member comprises a spindle.

3. A device according to claim 2 wherein the first lever is affixed with the spindle so that the first lever rotates when the spindle rotates.

4. A device according to claim 3 wherein the second lever is positioned on the spindle so that the second lever is freely rotatable with respect to the spindle and further comprising a pin positioned in the spindle for, upon rotation of the second lever about the spindle, contacting the second lever so that the second lever rotates the spindle and the first lever.

5. A device according to claim 2 or 3 further comprising a click affixed with the spindle and first lever for engaging with the second lever for controlling rotation of the spindle and the first lever.

6. A device according to claim 4 further comprising a click affixed with the spindle and first lever for engaging with the pin for controlling rotation of the spindle and the first lever.

7. A device according to claim 2 or 3 further comprising a torsion spring surrounding the spindle positioned for contacting the second lever so that subsequent to rotation of the second lever to the first position to rotate the spindle and first lever, the spring reciprocates the second lever to the first position.

8. A device according to claim 5 further comprising a torsion spring surrounding the spindle positioned for contacting the second lever so that subsequent to rotation of the second lever to the first position to rotate the spindle and first lever, the spring reciprocates the second lever to the first position.

9. A device according to claim 6 further comprising a torsion spring surrounding the spindle positioned for contacting the second lever so that subsequent to rotation of the second lever to the first position to rotate the spindle and first lever, the spring reciprocates the second lever to the first position.

10. A device according to claim 1 wherein the closure member has a lateral portion configured for guiding the closure member in the tube.

11. A device according to claim 1 wherein there are two metering chambers.

12. A device according to claim 1 wherein the volume of the metering chamber is variable.

13. A device according to claim 9 wherein the volumes of the metering chambers are variable.

14. A device according to claim 1 further comprising an slide member and a screw member wherein the slide member is positioned in communication with the metering chamber and the screw member is connected with the slide member for moving the slide member to adjust a volume of the chamber.

15. A device according to claim 1 further comprising a wall member positioned for preventing an entire weight of powder-form product from bearing upon the closure member.

16. A device according to claim 1 wherein the fourth chute interior wall portion has a cross-section which is substantially half of the third chute interior wall portion cross-section.

17. A device according to claim 1 wherein each metering chamber has a volume of between 4 ml and 20 ml.

* * * * *

UNITED STATES PATENT AND TRADEMARK OFFICE
CERTIFICATE OF CORRECTION

PATENT NO. : 5,577,642
DATED : November 26, 1996
INVENTOR(S) : Petr MASEK, et al.

It is certified that error appears in the above-indentified patent and that said Letters Patent is hereby corrected as shown below:

On the title page, under the heading [75] Inventors, "Jean-Fran cois" should be --Jean-Francois--.

Column 1, line 8, delete "for".

Column 3, line 1, change "and/a" to --and/or--.

Column 4, line 22, "reclosed" should be --closed--.

Column 4, line 26, there should be an "X" after "arrow".

Signed and Sealed this

Fourth Day of March, 1997

Attest:

BRUCE LEHMAN

Attesting Officer

Commissioner of Patents and Trademarks